Jan. 30, 1945.  A. BURCKHARDT ET AL  2,368,519
LETTER FEED AND SEPARATOR UNIT
Filed March 11, 1942  2 Sheets-Sheet 1
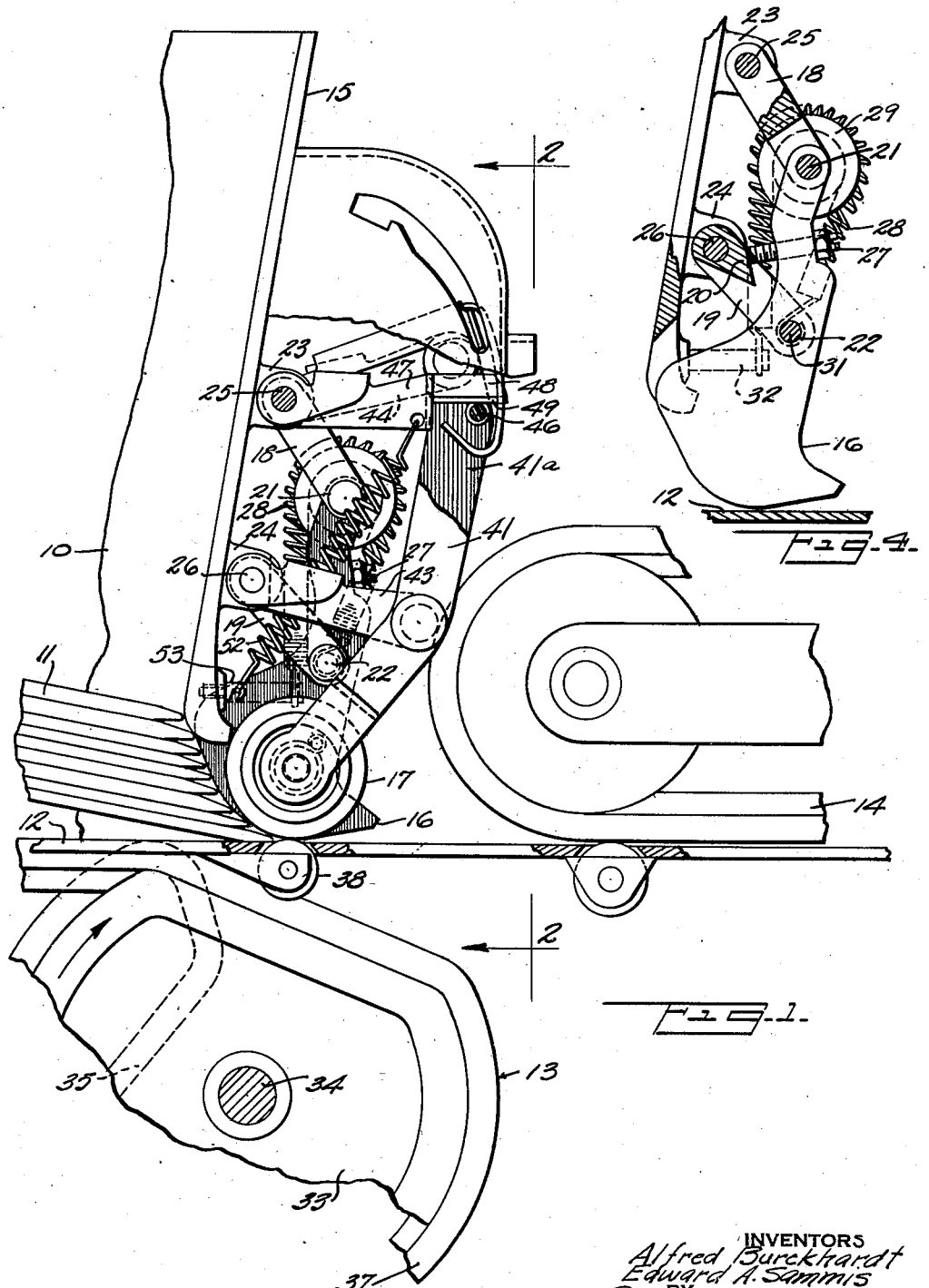
INVENTORS
Alfred Burckhardt
Edward A. Sammis
BY
Edwin H. Owen
ATTORNEY Jan. 30, 1945.  A. BURCKHARDT ET AL  2,368,519
LETTER FEED AND SEPARATOR UNIT
Filed March 11, 1942  2 Sheets-Sheet 2
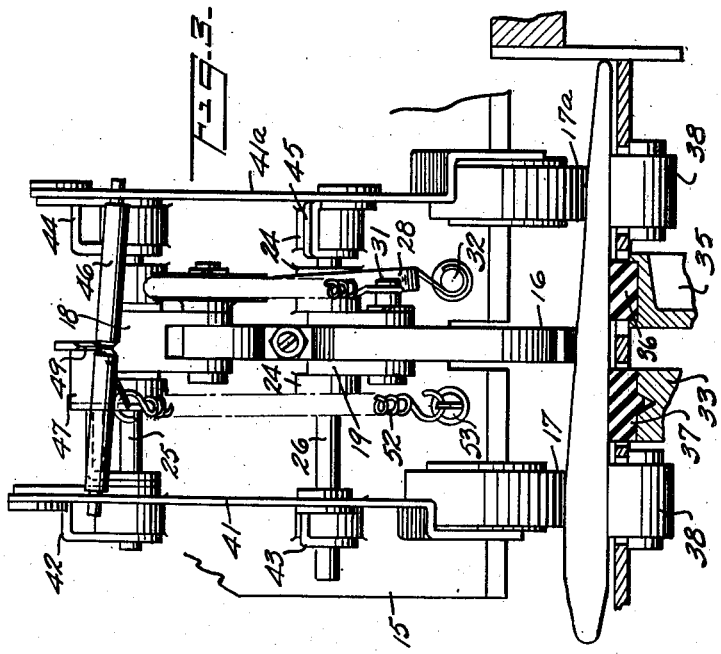
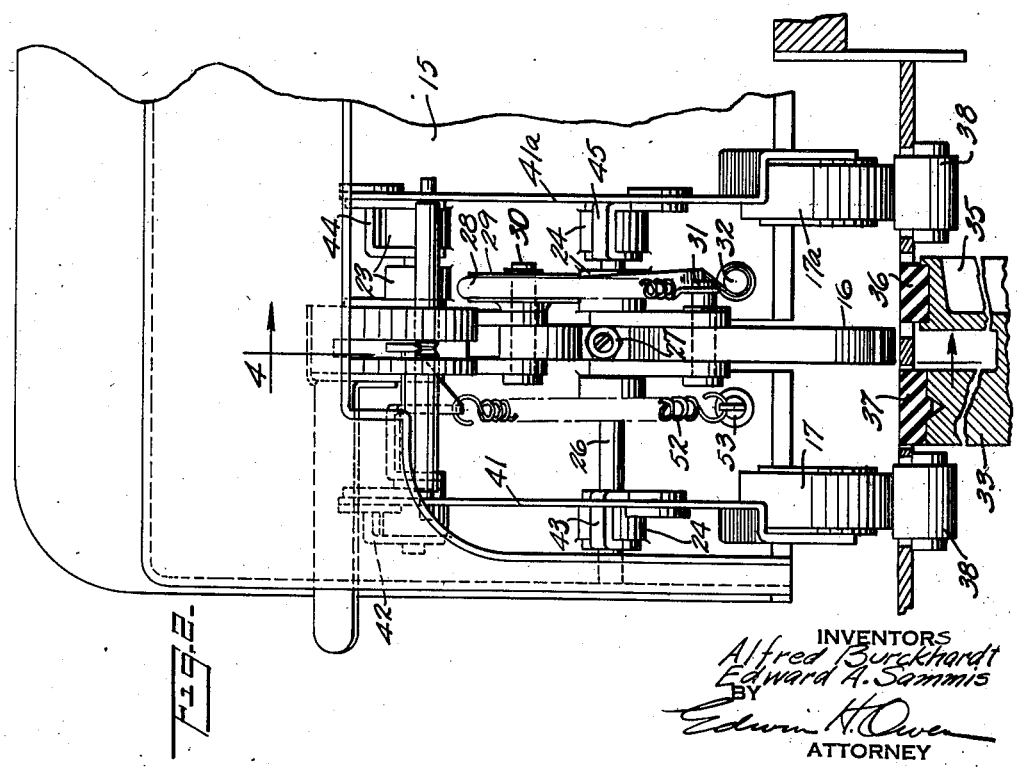
INVENTORS
Alfred Burckhardt
Edward A. Sammis
BY
Edwin H. Owen
ATTORNEY Patented Jan. 30, 1945

2,368,519

UNITED STATES PATENT OFFICE 2,368,519

LETTER FEED AND SEPARATOR UNIT

Alfred Burckhardt, Stamford, and Edward A. Sammis, Springdale, Conn., assignors to Pitney-Bowes Postage Meter Co., Stamford, Conn., a corporation of Delaware Application March 11, 1942, Serial No. 434,258

4 Claims. (Cl. 271—2)

This invention relates to a combined letter stripping and separator unit which is particularly adapted for use in a metered mailing machine or the like, where letters are stripped from the bottom of a stack of superimposed letters, one at a time, and are then fed to a printing station.

In devices of this character now in common use, stripping means is adapted to intermittently engage the lower surface of the lowermost letter of a stack of letters and, through frictional engagement therewith, move said letter from the stack to a letter feeding position. To restrict the feeding to a single letter at a time, restriction means is provided in the form of frictional surfaced members which normally lie in the path of the letters immediately above the lowermost letter to obstruct movement thereof.

It is the principal object of this invention to provide in a letter stripping and separator unit, means wherein the feeding elements possess characteristics which are inducive to improved letter feeding and wherein the separator elements possess characteristics which are inducive to improved separation.

With regard to the feeding elements of the unit, it is an object to provide in one element which cooperates with the stripping element, means which possesses sufficient mass and tension to cooperate most advantageously with the letter stripping means.

With regard to the separator elements, it is the object to provide means having a high frictional coefficient and supported under a very light tension, the frictional force being ample to overcome the friction resulting from the drag of the lowermost letter across the lower surface of an adjacent letter without causing any appreciable resistance to the normal feeding force.

It is a further object to provide two independently movable separator elements spaced apart, and to connect same in such manner that the tension on each is equalized.

It is a further object to provide anti-friction rollers opposite the separator elements to thereby decrease friction between the lower surface of the stripped letter and the supporting surface at the point of separation.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawings, wherein:

Fig. 1 is a side elevational view with parts broken away, showing a letter feeding and separator unit, and including a letter stripping element arranged in an operative position about to engage and strip the lowermost letter from a stack of letters;

Fig. 2 is an elevational view with parts in section and taken along the line 2—2 of Fig. 1;

Fig. 3 is a fragmentary view similar to Fig. 2, but showing the affect which a letter of uneven proportions has upon the separator elements; and Fig. 4 is a sectional view taken along the line 4—4 of Fig. 2.

Referring to Fig. 1, wherein a portion of the letter stripping and feeding devices of a metered mailing machine are shown, the mechanism illustrated includes a letter feed hopper 10 having a stack of letters 11 shown therein, a letter feed plate 12, a stripper element 13, and driven letter feed means 14. The letter feed hopper 10 includes an end wall 15 which has its lower surface spaced above the feed plate 12, to provide space through which the letters 11 pass during stripping.

On the outside of the wall 15, the feed and separator unit is mounted, which unit includes a feed shoe 16 and separator rollers 17—17a.

The feed shoe preferably comprises a block of solid metal which is suspended from arms 18 and 19, said arms having their forward ends connected with the shoe at 21 and 22 respectively, and their rearward ends connected with rods 25 and 26. Said rods 25 and 26 are supported in suitable lugs 23—24 projecting from the wall 15. By reason of this means of mounting, the shoe will be suspended from the ends of the arms 18 and 19, and owing to the mass or weight of said shoe it is normally urged toward the feed plate 12. By means of an adjustment screw 27, however, which passes through the upper end of the shoe and which has its inner end in engagement with a yoke portion 20 of the arm 19, the said shoe is adapted to be adjusted slightly above the feed plate 12. This adjustment is usually made to accommodate the thinnest piece of mail matter which passes thereunder, as for instance a postcard.

In addition to the weight of the shoe 16, tension is also applied by means of a spring 28 which is wrapped around a sheave wheel 29 and has one end anchored to a pin 31 and the other end anchored to a pin 32. Said sheave wheel is mounted at the end of a pin 30 which extends through the upper end of the shoe and which forms a part of the connection 21.

Cooperating with said feed shoe in the feeding of a letter, is the stripper element 13. Said stripper element may be of any common form and in the present instance comprises a pulley 33 supported on a power driven shaft 34. Attached to said pulley 33 is a shoe 35 having a preferably frictional surfaced portion, as indicated at 36. A frictional belt 37 is also provided on the pulley 33.

Said pulley 33 and shoe 35 are arranged beneath and at either side of the feed shoe 16 as best shown in Figs. 2 and 3, and owing to the surface contour of each, are adapted to engage the lower surface of the lowermost letter in the stack and lift same slightly when the letter is impinged between the stripper means 13 and the feed shoe 16. The frictional engagement of the stripper means effects the initial pickup and feed of the lowermost letter which is immediately assisted by the counter pressure applied by the feed shoe 16. According to this method of feeding, the weight of the shoe 16 produces a strong counter force when the letter is moved by the frictional engagement of the stripper element therewith, to thereby effectively grip the letter. Further, the lower surface of the shoe 16 is polished smooth to provide a minimum of friction. To further reduce the frictional contact of the letter surface during initial feeding or stripping, anti-friction rollers 38—38 are positioned directly beneath the letter surface and at either side of the pulley 33 and shoe 35.

Feeding is effected, therefore, during each rotation of the pulley 33 and shoe 35, when the frictional surfaces thereof engage with the lower surface of the lowermost letter and move said letter forward a sufficient distance to permit same to be engaged by the letter feed belt of the letter feed means 14 for further conveyance.

During the feeding of a letter, means is provided to prevent those letters immediately above the one which is fed from advancing. Said means is known as separation and in the construction here provided, comprises the separator rollers 17—17a which are provided with a preferably rubber peripheral surface having a high coefficient of friction. The roller 17 is supported at the end of a bracket 41, which bracket is suspended from the wall 15 in such manner that it may move in a slightly forwardly and vertical direction. The supporting means for the the bracket 41 comprises links 42 and 43, which links have their inner ends pivotally mounted on the aforementioned rods 25—26, and have their opposite ends connected with the bracket 41. In a like manner the bracket 41a is connected with the rods 25—26 by links 44 and 45 respectively. By this arrangement of supporting structure, each roller 17 and 17a is independently movable.

The supporting brackets 41 and 41a for said rollers 17 and 17a are flexibly connected, however, by means of a bridging rod or whiffle tree 46, which has the opposing ends thereof freely positioned in suitable openings within the brackets 41 and 41a respectively.

Tension is also provided to urge the rollers 17—17a in a downward direction, and is so arranged that an increase in tension on one roller, resulting from the rise of said roller to a position higher than the other, will cause a similar increase in tension on the opposite roller. Such compensating of tension is provided by directing the force of the tension to a position midway between the ends of the bridging rod 46. This is effected by pivotally mounting an arm 47 on rod 25 in such manner that the free end thereof 48 will engage the center of the bridging rod 46, a knife edge 49 being provided at the free end 48, which is adapted to fit within a groove 51 in the bridging rod 46 for this specific purpose. A spring 52 is then stretched between the arm 47, and an anchor pin 53, to provide tension for each of the separator rollers 17 and 17a.

It will be seen that so long as the rollers 17 and 17a are on the same plane the tension upon each roller will be substantially the same. It is further apparent that when a letter passes beneath the separator rollers which is higher along one side than the other such as indicated in Fig. 3, the lift of the roller on the higher side will effect an increased tension thereon, but owing to the fact that the tension is applied at the center of the bridging member, or rod 46, the same increase of tension will be applied to the opposite roller. By this novel means of equally distributing the tension, letters move along a straight path and skewing is avoided.

By means of the above named arrangement for the mounting of both the feed shoe and the separator rollers as a unit, a careful balance has been provided, whereby feeding of the letter is enhanced; first, as a result of the mass or weight of the feed shoe plus the tension provided therefor, which acts as a counter force and cooperates most effectively with the stripper element 13; and secondly, as a result of the light tensioned flexible mounting for the separator rollers, including their high frictional coefficient which repel the advancement of those letters directly above the one which is being fed, yet with a minimum of counter frictional effect upon the letter which is being fed.

From Fig. 1 it will be noted that the inner contour of the lower surface of the feed shoe 16 is also shaped to provide for pre-separation of the letters as they approach a stripping position.

Having described the invention what is claimed is:

1. In a letter stripping and separator unit, stripper means engageable with one surface of a letter to effect stripping thereof from the bottom of a stack of superimposed letters, an anti-friction feed shoe comprising mass and engageable with the opposite surface of the letter to effect an opposing force and thereby increase the bite between said stripper means and feed shoe, and a plurality of spaced and independently movable separator members having a high frictional coefficient and positioned in the path of the letters.

2. In a letter stripping and separator unit, stripper means engageable with one surface of a letter to effect stripping thereof from the bottom of a stack of superimposed letters, an anti-friction feed shoe comprising mass and engageable with the opposite surface of the letter to effect an opposing force and thereby increase the bite between said stripper means and feed shoe, a plurality of spaced and independently movable separator members having a high frictional coefficient and positioned in the path of the letters, and anti-friction rollers positioned opposite the separator members.

3. In a letter stripping and separator unit, stripper means engageable with one surface of a letter to effect stripping thereof from the bottom of a stack of horizontally disposed superimposed letters, a feed shoe comprising mass and engageable with the opposite surface of the letter to effect a relatively heavy counter force and thereby assist said stripper means during letter stripping, a plurality of spaced and independently movable separator members having a high frictional coefficient and positioned in the path of the letters, and means to effect a light tension between the separator members and letter.

4. In a letter stripping and separator unit, stripper means engageable with one surface of a letter to effect stripping thereof from the bottom of a stack of horizontally disposed superimposed letters, a feed shoe comprising mass and engageable with the opposite surface of the letter to effect a relatively heavy counter force and thereby assist said stripper means during letter stripping, two spaced and independently movable separator members having a high frictional coefficient and positioned in the path of the letters at either side of the feed shoe, and tension means connected with the separator members to effect a relatively light drag upon a letter during stripping.

ALFRED BURCKHARDT.
EDWARD A. SAMMIS.